United States Patent [19]

Bushinsky et al.

[11] Patent Number: 5,068,058
[45] Date of Patent: Nov. 26, 1991

[54] PRODUCTION OF AMMONIA SYNTHESIS GAS

[75] Inventors: Joseph P. Bushinsky, Allentown; David M. Nicholas, New Tripoli; Shoou-I Wang; Nitin M. Patel, both of Allentown, all of Pa.

[73] Assignee: Air Products and Chemicals, Inc., Allentown, Pa.

[21] Appl. No.: 347,609

[22] Filed: May 4, 1989

[51] Int. Cl.⁵ .................................................. C01C 1/04
[52] U.S. Cl. .................................. 252/376; 252/373; 423/359
[58] Field of Search .............. 423/359; 252/376, 373

[56] References Cited

U.S. PATENT DOCUMENTS

| | | | |
|---|---|---|---|
| 3,278,452 | 10/1966 | Vorum | 252/376 |
| 3,479,298 | 11/1969 | Size et al. | 252/373 |
| 4,077,779 | 3/1978 | Sircar et al. | 55/25 |
| 4,079,017 | 3/1978 | Crawford et al. | 252/373 |
| 4,171,206 | 10/1979 | Sircar | 55/26 |
| 4,376,758 | 3/1983 | Pagari et al. | 423/359 |
| 4,383,982 | 5/1983 | Pinto | 423/359 |
| 4,409,196 | 10/1983 | Skinner et al. | 423/359 |
| 4,442,020 | 4/1984 | Fuderer | 252/373 |
| 4,479,925 | 10/1984 | Shires et al. | 423/359 |
| 4,822,521 | 4/1989 | Fuderer | 423/359 |
| 4,846,851 | 7/1989 | Gurd et al. | 423/359 |
| 4,919,844 | 4/1990 | Wang | 252/373 |

FOREIGN PATENT DOCUMENTS 0212889 1/1986 European Pat. Off. .

OTHER PUBLICATIONS

Kirk-Othmer:*Encyclopedia of Chemical Technology* (3d ed. 1980), at pp. 486 and 488.
*Hydrocarbon Processing,* Apr. 1984, (at p. 103).

Primary Examiner—Wayne A. Langel
Attorney, Agent, or Firm—John M. Fernbacher; James C. Simmons; William F. Marsh

[57] ABSTRACT

A method is disclosed for producing ammonia synthesis gas by splitting a methane stream, combusting a portion of the methane with steam and oxygen-enriched air, converting a second portion of the methane with steam in a reformation heated by the combustion products of the first portion and combining the two portions for the water gas shift reaction followed by adsorptive separation of contained carbon dioxide.

13 Claims, 3 Drawing Sheets

PRODUCTION OF AMMONIA SYNTHESIS GAS

TECHNICAL FIELD

The present invention relates to ammonia synthesis and is more particularly concerned with improvements in the production of ammonia synthesis gas ($H_2$ and $N_2$) from normally gaseous hydrocarbons such as natural gas.

BACKGROUND OF THE INVENTION

In known commercial production of ammonia synthesis gas a hydrocarbon feed (usually natural gas) is subjected to steam reforming (SMR) followed by secondary oxidative reforming in the presence of sufficient added air to provide the required nitrogen component for $NH_3$ production. The raw product from secondary reforming is generally further processed by shift conversion of contained CO to $CO_2$ and removal of the resulting carbon dioxide by known separation methods; in most instances by scrubbing the shifted product gas with monoethanolamine (MEA), alkaline carbonate or other solvent absorbent. Residual carbon oxides, which are poisons to the catalyst employed in the ammonia synthesis reaction, are converted to methane by hydrogenation (methanation). Following the foregoing recited steps the synthesis gas which is introduced into the ammonia synthesis recycle loop, is relatively free of carbon oxides, but contains inert impurities, particularly methane and argon. These inert impurities are purged to eliminate their buildiup in the ammonia synthesis loop. A process flow diagram of a typical commercial system is shown in Kirk-Othmer: Encyclopedia of Chemical Technology (3d edition 1980) at pages 486 and 488.

PRIOR ART

A number of variations at the several stages of the basic route from hydrocarbon conversion through removal of contaminants and recovery of a suitable feed to the actual ammonia synthesis step, are disclosed in the prior patent art. These include, for example, suggested diversities in the reforming of the initial hydrocarbon feed, the manner of removing of harmful carbon oxides from the reformate or their conversion to inert products, as exemplified by U.S. Pat. Nos. 3,278,452; 3,479,298, 4,376,758 and 4,442,020.

The current commercial process for production of ammonia synthesis gas presents a number of drawbacks:

a) The removal of $CO_2$ from the reformate by selective absorption in liquid solvent is energy intensive.

b) The high capital and operating costs entailed in installations employing a relatively large primary reformer (SMR) and a secondary air reformer together with energy requirements in convection waste heat recovery and heat losses sustained through the walls and stacks of such installations.

c) The impurities present in the synthesis gas buildup in the conventional ammonia recycle loop need to be purged to maintain efficient syngas conversion to ammonia (which is dependent on partial pressure of the reactants $N_2$ and $H_2$). The purge results in a loss of valuable reactants in addition to inerts. The buildup of inerts also results in a larger recycle stream requiring greater recompression and a large sized synthesis reactor and loop.

While small amounts of inert gases, such as unconverted methane and argon, may be permitted in the gas feed to the ammonia synthesis reaction, it is important that the charge be free of detrimental carbon oxides. Accordingly, various systems have been suggested or employed for removal of these. Generally, contained CO is converted to $CO_2$ by conventional water-gas shift reaction. Removal of $CO_2$ from various hydrogen-rich gas mixtures may be carried out by known methods, such as more commonly by absorption in a physical solvent and to lesser extent by cryogenic fractionation, selective membrane separation, or by selective adsorption by solid adsorbent in a pressure swing adsorption system as described for example in U.S. Pat. Nos. 4,077,779 and 4,171,206. Any residual carbon oxides may be removed by methanation.

According to U.S. Pat. No. 4,079,017, the initial hydrocarbon charge with added steam is separated into several portions; one of which portions is subjected to primary reforming by radiant heat and a second portion is separately subjected to primary reforming by indirect heat exchange with hot process gas. The two partial reformates are combined and subjected to secondary reforming in the presence of added air and steam; the obtained secondary effluent providing the hot process gas utilized in said indirect heat exchange.

U.S. Pat. No. 4,376,758 illustrates (FIG. 1) a schematic flow diagram of a process for ammonia synthesis from the reforming of the hydrocarbon charge through to the recovery of the ammonia. In addition to the conventional primary steam reforming of part of the fresh hydrocarbon charge in a fuel-fired furnace and secondary reforming of the partial reformate with added air, the obtained secondary reformate is employed as indirect heat exchange medium for "tertiary reforming" of another portion of the fresh hydrocarbon charge.

Carbon monoxide present in the effluent from the tertiary reforming step is converted to $CO_2$ by conventional shift reaction, the $CO_2$ being removed by absorption in a liquid solvent. Residual carbon oxides are then converted by methanation. The methanated product needs to be compressed and dried before introduction into the ammonia synthesis reaction. U.S. Pat. No. 4,442,020 discloses a process for catalytic steam reforming of hydrocarbons to produce a hydrogen-rich product gas, which process utilizes a primary steam reformer and a reformer heat exchanger. The major portion of the hydrocarbon feed is charged with steam directly to the first primary reformer and the remaining minor portion of the hydrocarbon feed is charged with added steam directly to the exchange reformer. The hot reformed effluent from the first primary reforming zone is sent to the reformer-exchanger wherein the heat content of that introduced effluent is utilized by indirect exchange. In an alternative optional embodiment described, the effluent from the primary steam reforming may be subjected to secondary reforming with air or oxygen before its introduction into the reformer exchanger, air being employed instead of oxygen when ammonia synthesis gas is to be produced instead of pure hydrogen.

In U.S. Pat. No. 4,479,925 ammonia synthesis gas having excess nitrogen is produced in a reactor-exchange primary reformer followed by an autothermal secondary reformer. A part of the total fresh hydrocarbon feed is introduced directly into the secondary reformer, the allocation between the primary and secondary being in the ratio of 1:1 to 3:1 with the preference being approximately twice as much fresh feed going to the primary reformer as that sent to the secondary reformer. The quantity of air introduced results in a secondary reformate containing an amount of nitrogen in excess of the desired 3:1 $H_2/N_2$ mol ratio. All or part of the excess nitrogen may be removed by pressure swing adsorption (no particulars being described), but preferably such removal is effected in a purge stream withdrawn from the ammonia synthesis loop, employing a semi-permeable membrane or a cryogenic process. The inerts thus separated from the recovered hydrogen, which include nitrogen, argon and methane; are sent to use as turbine fuel. The hydrogen is recycled to the $NH_3$ synthesis reaction.

According to the method advocated in published European patent application 0212889, a methane-rich hydrocarbon gas stream is partly burned and reacted in a preheated mixture of steam and air; the obtained reformate, after cooling, is subjected to shift reaction. At least most of the carbon dioxide content is removed from the shifted product by absorption in a physical solvent preferably followed by methanation to convert most of the remaining carbon oxides to inert $CH_4$. In the following PSA stage the gas mixture is separated to provide a product stream containing hydrogen and nitrogen in desired proportions and a separated waste gas stream containing excess nitrogen, a small quantity of hydrogen, as well as minor quantities of carbon oxides, methane and argon. The adsorption step in the PSA unit is conducted until break-through of nitrogen occurs to such extent that the product gas stream, integrated over the entire adsorption step, has the desired nitrogen content.

Autothermal reforming is a known process for production of hydrogen and other gases for ammonia synthesis, methanol or oxy-synthesis. As described in Hydrocarbon Processing, April 1984 (at page 103), the process comprises a combination of partial oxidation and steam reforming over a nickel catalyst. The preheated mixture of hydrocarbon and steam is mixed at the top of an autothermal refractory-lined reactor with air and/or oxygen with resulting combustion. The obtained heat is utilized partly for the endothermic steam reforming reaction, and the reformate is discharged at a temperature in the range of 1700°-1800° F. (900°-1000° C.).

Among the objects of the present invention is that of improving the efficiency of the process for production of ammonia synthesis gas from reforming of a hydrocarbon feed, particularly from the standpoint of reducing capital and operating costs. An important novel feature of the invention lies in the use of an autothermal reformer, coupled to an Enhanced Heat Transfer Reactor, (EHTR) to produce ammonia syngas, instead of employing the steam reforming furnace and secondary air reformer advocated or employed by the prior art. Further, in accordance with the present invention, oxygen-enriched air is employed in the autothermal reformer, thus providing better control of the $H_2/N_2$ ratio in the syngas product, as well as affording better heat integration and reduced natural gas requirements for a given syngas product ($H_2$ plus $N_2$). Purification of the reformate is preferably accomplished by selective adsorption in a pressure swing system (PSA).

SUMMARY OF THE INVENTION

In accordance with the present invention natural gas or other hydrocarbon stream rich in methane, is divided into two portions. The major portion, consitituting 60% or more of the fresh hydrocarbon charge, together with added steam, is externally preheated to a temperature in the range of 900° to 1000° F. (480° to 540° C.) and introduced into an autothermal reactor. Also introduced into the reactor is oxygen-enriched air whereby a portion of the hydrocarbon charge is combusted with evolution of heat, thereby effecting oxidative conversion of the hydrocarbon charge to carbon oxides and production of hydrogen. The products discharged from the autothermal reactor are introduced into one end of an enhanced heat transfer reactor (EHTR) at an inlet temperature in the range of 1500° to 1750° F. (815° to 955° C.). The minor portion of the fresh hydrocarbon charge is introduced at the opposite end of the EHTR reactor at a temperature in the range of 650° to 750° F. (345° to 400° C.) and is passed through reaction tubes within said reactor, which tubes are filled with steam reforming catalyst, such as supported nickels. The tubes are heated to reforming temperature (in the range of 1450° to 1550° F.; 790° to 845° C.) by the hot effluent from the autothermal reactor passed through the EHTR in indirect heat exchange with the outer walls of the tubes. The obtained reformate discharged from the catalyst tubes mixes with the reaction products from the autothermal reactor and the combined products are discharged from the EHTR as a crude ammonia synthesis gas mixture. The described combination of autothermal reforming with utilization of the heat content of the partial reformate for reforming of part of the fresh hydrocarbon charge typically obtains 90 to 95% or higher conversion of the total charge and, depending upon the oxygen content of the enriched air employed, provides a crude syngas having a hydrogen to nitrogen molar ratio in excess of 1.5.

The obtained syngas is subjected to a conventional water gas shift reaction whereby contained CO is converted to $CO_2$ with accompanying release of additional hydrogen, bringing the $H_2/N_2$ ratio closer to that desired for ammonia synthesis. Carbon dioxide is removed from the crude syngas by pressure swing adsorption.

Contained methane and residual carbon monoxide are also removed, thereby yielding an ammonia syngas product consisting essentially of hydrogen and nitrogen free of carbon oxides, and containing less than 0.5% of other contaminants.

The operation of the invention will be fully understood and certain of its advantages more fully appreciated from the detailed description which follows read in connection with the accompanying drawings illustrating a practical embodiment for practice of the invention.

DETAILED DESCRIPTION OF THE INVENTION

Figure 1:
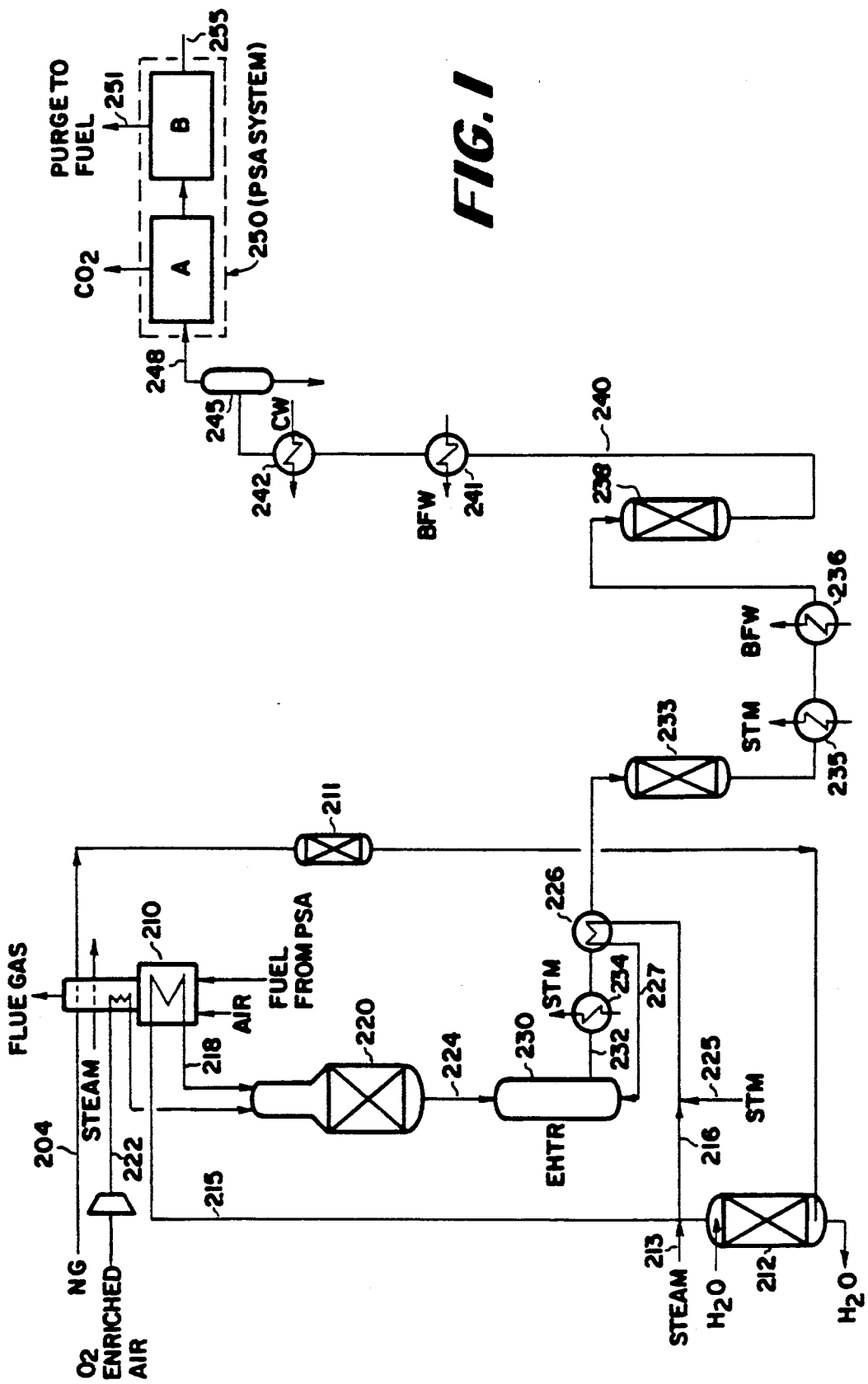
FIG. 1 is a schematic flow diagram of an operation in accordance with the invention for production of ammonia syngas by reforming of hydrocarbons with steam and air.

As illustrated in FIG. 1 of the accompanying drawings, the starting fresh hydrocarbon feed, typically natural gas (NG) or other hydrocarbon vapor stream rich in methane 204, is passed through the flue gas stack of a small fuel-fired heater 210 wherein it is preheated to a temperature of about 750° F. (~400° C.) and then desulfurized by being passed through a zinc oxide bed 211. The desulfurized product is saturated with water at 212, then further mixed with hot steam as indicated at 213. As a result of the saturation of 212 the hot hydrocarbon stream acquires a steam to carbon ratio of about 1.7. The steam to carbon ratio is increased at 213 to about 2.5 by injection of steam (420 psia), superheated to 480° F. (~250° C.), into the wet hydrocarbon stream.

Following steam injection at 213 the hydrocarbon stream is divided into a major portion (line 215) and a minor portion (line 216) containing up to about 20 to 40% of the hydrocarbon charge in line 204. The hydrocarbon plus steam in line 215 is further heated to a temperature in the range of 900 to 1000° F. (480° to 540° C.), preferably to about 1000° F. (~540° C.), in the radiant section of heater 210 and is introduced by line 218 into the inlet of an autothermal reactor 220.

Oxygen-enriched air having an oxygen content in the range of 23 to 47% $O_2$, preferably about 23 to 25% $O_2$, is passed by line 222 through the flue stack of heater 210 where it is heated to about 900° F. (~480° C.) and at that temperature is introduced into the inlet of autothermal reactor 220. Thus, a portion of the hydrocarbon is combusted by reaction with oxygen near the inlet end of reactor 220. The products formed in passing through reactor 220 are discharged via line 224 at an attained temperature in the range of about 1500° to 1750° F. (815° to 955° C.), preferably at around 1730°-1735° F. (~945° C.). The waste the available in the effluent from reactor 220 is used to reform the minor portion of the hydrocarbons in line 216, as hereinafter described.

As indicated at 225, steam is added to the hydrocarbon stream 216 and the steam/hydrocarbon ratio thus brought to about 6. This hydrocarbon plus steam mixture is heated by indirect exchange at 226 and introduced into the enhanced heat transfer reactor 230.

Figure 2:
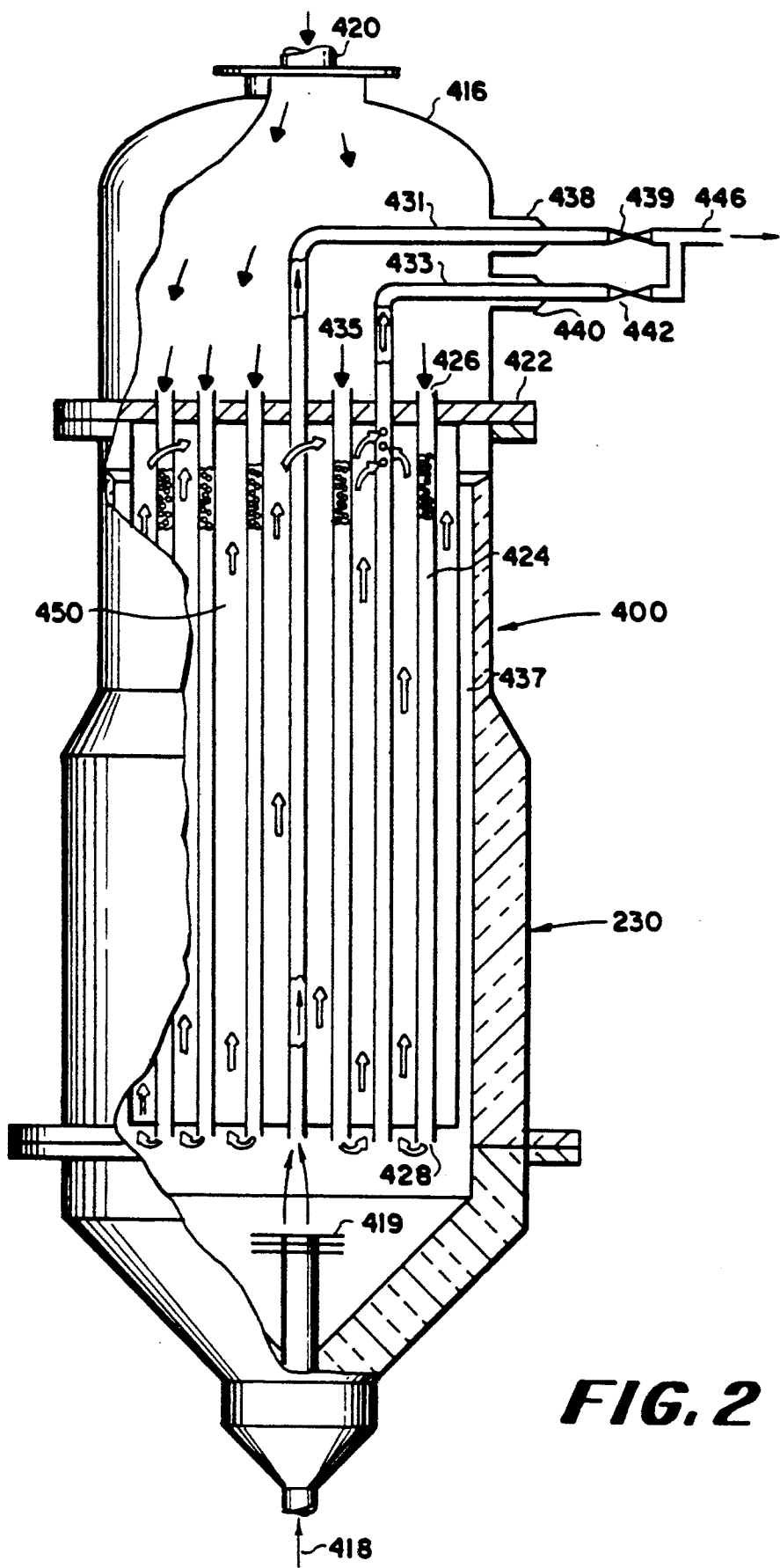
FIG. 2 is a front view of an enhanced heat transfer reactor, portions of the outer wall being broken away to display internal structure.

Details of reactor 230 are illustrated in FIG. 2 of the drawings. As seen in FIG. 2, reactor 230 comprises a generally elongated cylindrical vessel 400 housing a discrete array of reaction tubes 424 held in the shell of the vessel by a tube sheet or plate 422 situated at the upper end of the vessel. The tube sheet or plate 422 completely closes off the end 416 of the reactor except for the inlet ends 426 of the reaction tubes 424. The interior of reactor 230 is preferably lined with castable refractory insulation. The preheated mixture of hydrocarbons and steam (line 227, FIG. 1) is introduced into the inlet 420 of the reactor. The effluent from autothermal reactor 220 (FIG. 1) which is to serve as the heating medium, is introduced at the opposite end of reactor 230 through inlet 418 and diffuser plate 419, and is distributed by the plate within the shell side 450 constituting the reaction zone. The arrangement of the inlets 418 and 420 may be reversed so that the raw hydrocarbon stream enters the bottom of the reactor and the heating medium from line 224 is introduced into the shell side from the top of the reactor (as diagramatically portrayed in FIG. 1. Also, other known forms of gas distribution in the shell area may be employed in lieu of plate 419 and shroud 437, such as a perforated plate, packing material or suitably arrange baffles.

For improving heat exchange between the heating medium and the raw gas feed, the exterior surfaces of tubes 424 may be provided with fins (not shown) arranged horizontally, vertically or wound thereon in spiral fashion.

The tubes 424 are packed with known steam reforming catalyst such as supported nickel. The mixture of natural gas and steam introduced at inlet 420 enters into the plenum area of the reactor and passes through the catalyst-containing tubes 424 at their inlets 426 through the perforated plates (not shown) fitted at the ends thereof.

In passing through the catalyst in tubes 424 the reactants (methane and steam) are heated to reformation temperature in the range of 1450° to 1550° F. (790°-845° F.) by heat exchange against the hot reformate discharged at the exit end of tubes 424 as well as against the hot reformed product from line 224 (FIG. 1) introduced through inlet 418. The reformate is discharged from the outlet ends 428 of reaction tubes 424 which are fitted with perforated end plates (not shown) to retain the catalyst in the tubes.

The reformed product discharged from tubes 424 is blended with that introduced through inlet 418 and pass together longitudinally up along the external surfaces of the reaction tubes, thereby providing by indirect exchange the heat required for the catalytic reforming reaction taking place with the tubes. The combined products enter one or more discharge tubes 433 through perforations 440 under control of valve 442. A portion of the combined products may be bypassed through tube 431 to control temperature. The bypassed product is discharged from tube 431 through outlet 438 under control of valve 439. The product passing through valve 439 may be combined with the main product passing through valve 442 and the combined products discharged via line 446.

By use of a heat exchange reforming furnace, of the type illustrated in FIG. 2, in conjunction with an autothermal reforming furnace, increased efficiency is achieved by reduction in the amount of fuel needed to provide the heat for reforming.

As is further illustrated in FIG. 1, the combined reformates leaving reactor 230 are conducted by line 232 to high temperature water gas shift reactor 233, being cooled enroute by heat exchange at 234 and 226 to a temperature in the range of 600° to 750° F. (315° to 400° C. ). The partially converted product discharged from reactor 233 is cooled, as indicated at 235 and 236, and introduced into the low temperature shift reactor 238. The shifted product discharged from reactor 238 now will have a hydrogen to nitrogen ratio above 1.5 and will contain in addition to carbon oxides small amounts of unconverted methane and argon.

While various methods of treating the shifted gas stream to remove carbon oxides and other undesired components are known in the art, it is preferred in the practice of the present invention to employ a pressure swing adsorption (PSA) system wherein carbon dioxide is first removed by selective adsorption followed by separate removal of methane and carbon monoxide, as well as part of the argon.

U.S. Pat. No. 4,171,206 discloses a PSA system designed for treatment of a shift converted effluent gas from a hydrocarbon reformer plant, wherein hydrogen and carbon dioxide are separately recovered as desired key components substantially free of minor components such as methane, carbon monoxide and nitrogen. The system described in the cited patent, may be employed in practice of the present invention, as is hereinafter described.

The shifted reaction products discharged from reactor 238 via line 240 are cooled by heat exchange at 241 and 242 to condense contained water, the bulk of which is removed in liquid separator 245. Following water removal the vapor overhead from 245 is introduced by line 248 into the PSA system represented by block 250.

Figure 3:
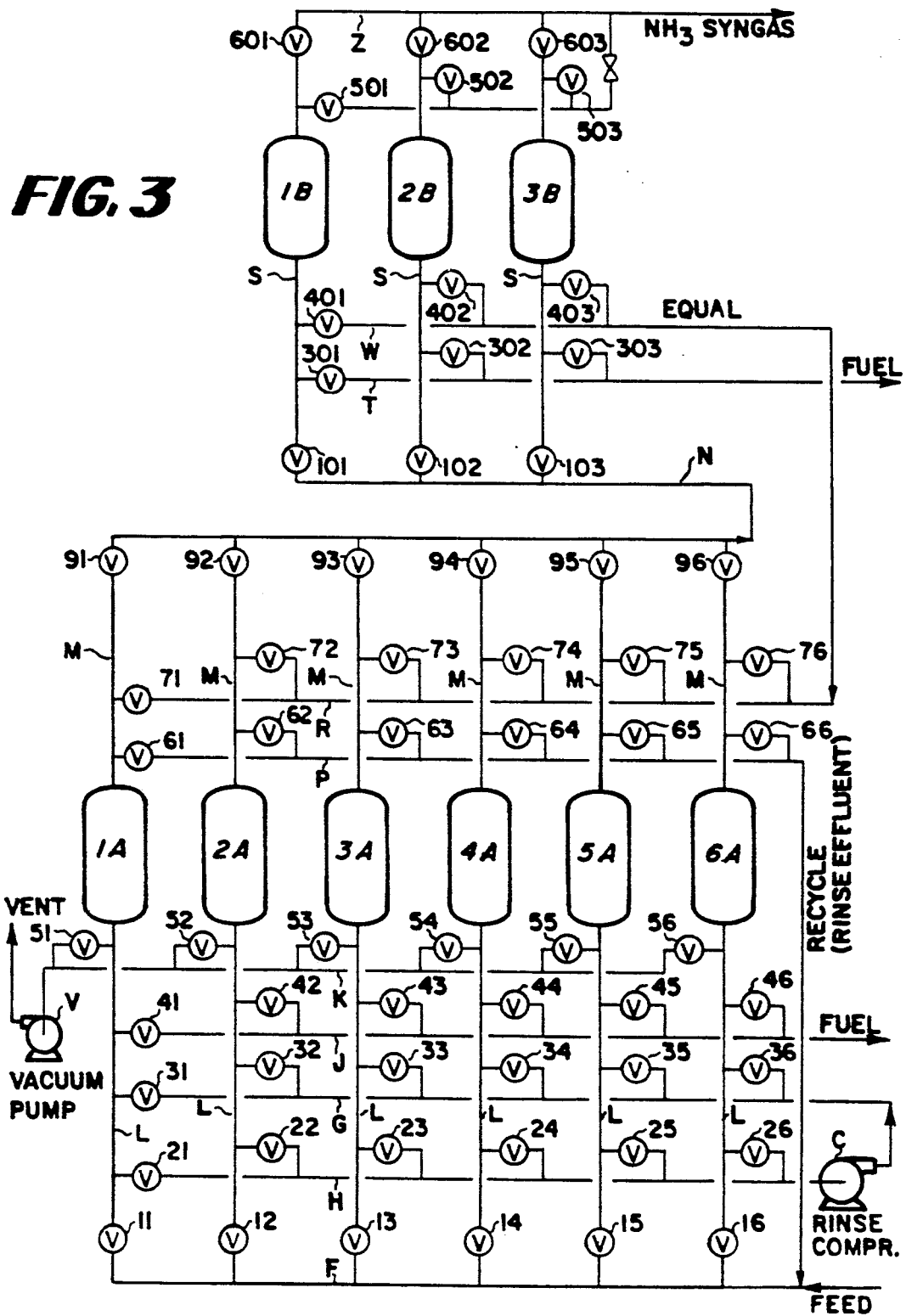
FIG. 3 is a schematic flow diagram of a preferred integrated PSA system for use in recovery of hydrogen and nitrogen from the crude reformate.

The PSA system preferably employed is illustrated in FIG. 3 of the accompanying drawings, and corresponds generally to that described in the cited '206 patent, pertinent details of which are herein incorporated by reference.

As seen in FIG. 3, the preferred PSA system employs a group of six adsorbent vessels with connecting conduits designed for operation in parallel in timed sequence, each of these vessels being connected to a second group of three adsorbent vessels through valved conduits designed to enable enable a selected vessel of the first group to be placed in series flow communication with a selected vessel of the second group. The first group of vessels or adsorbent columns are labeled respectively 1A, 2A, 3A, 4A, 5A and 6A. The second group of vessels or adsorbent columns are labeled respectively 1B, 2B and 3B.

The crude syngas from line 248 (FIG. 1) is introduced into the feed manifold F of the PSA system and undergoes a sequence of operations as hereinafter summarized.

At the inlet of each of the six vessels of the A group there is a gas connecting line L through which under appropriate valve openings gas can be selectively introduced and withdrawn from each of these A vessels. A gas manifold G is connected to the outlet of compressor C, whereby compressed gas can be introduced at the inlet of the desired vessel of the A group through its line L, through a valved connection between manifold G and that line by opening the desired valve shown respectively at 31, 32, 33, 34, 35, 36.

The inlet of compressor C is connected to gas manifold H, which in turn is connected to line L of each of the vessels of the A group by a valved connection under control of valves 21, 22, 23, 24, 25, 26 respectively, by means of which gas can be selectively withdrawn from the desired vessel into manifold H, compressed at C and transferred into any one of the other vessels of the A group as desired through manifold G on opening the appropriate valve in the group numbered 31 to 36.

Each of the vessels of the A group is also connected to a gas withdrawal manifold J through its line L under control of valves 41, 42, 43, 44, 45, 46 respectively. On opening the appropriate valve in the 41–46 numbered group, gas will flow from its associated vessel through its line L and into manifold J for discharge therefrom or other desired disposition.

Each of the vessels 1A through 6A also is in flow communication with a vacuum pump V through a manifold K, the manifold K being connected to each of these A group vessels through line L and through control valves 51, 52, 53, 54, 55, 56 respectively. Line L may be connected to the A vessel at an intermediate level (as shown) or at the feed inlet end of the vessel. Thus, by opening the appropriate valve of the group numbered 51–56, the associated vessel can be evacuated by operation of pump V and the gaseous product withdrawn from that vessel discharged from manifold K.

At the top of each of the columns 1A through 6A (hereinafter sometimes referred to as the outlet end) is a connecting line M in flow communication with a common gas receiving conduit N. Each of the A group vessels can thus discharge gas into conduit N through its associated line M by opening of the respective control valve 91, 92, 93, 94, 95, 96. Each of the vessels of the A group through its associated line M, is also connected to a common gas withdrawal conduit P under control of the respective valves 61, 62, 63, 64, 65, 66. Conduit P is in direct flow communication with manifold F.

Each of lines M is also connected through a branch to a common gas distributing conduit R under control of a valve 71, 72, 73, 74, 75, 76 respectively. By opening the appropriate valve of the 71–76 series, the associated A group vessel is brought into flow communication with conduit R.

Each of the vessels 1B, 2B, 3B is provided at its lower end (sometimes hereinafter called inlet end) with a gas line S connected to common gas receiving conduit N under control valves 101, 102, 103 respectively. By opening a selected one of these valves 101, 102, 103 gas will flow from line N into the associated vessel 1B, 2B or 3B through its line S.

Lines S also connect with a common tertiary gas product discharge conduit T under control of valves 301, 302, 303 respectively. The lower ends of vessels 1B, 2B, 3B are also in gas flow communication with gas distributing conduit R. As shown, each of the lines S of the group B vessels has a valve-controlled branch 401, 402, 403 respectively, discharging into a common gas collecting conduit W in direct flow communication with conduit R. By opening the selected valve 401, 402 or 403, gas will be caused to flow from the B vessel associated therewith into connecting conduit W and thence into distributing conduit R. By opening a selected valve in the 71–76 group gas can be caused to flow downward from conduit R into the associated vessel of the A group.

Each of the B vessels at its top end (sometimes hereinafter referred to as outlet end) is in flow communication with a primary product discharge manifold Z under control of a valved connection 601, 602, 603 respectively. By opening of any one of these, valves gas will be caused to flow from the associated B vessel into manifold Z and thereby discharge unadsorbed primary products from that vessel. A portion of the primary products in manifold Z can be passed downward into any of the B vessels which is then at lower pressure than that of the gas in manifold Z. This is accomplished through valved connections 501, 502, 503 respectively. By opening any one of these valves 501–503 associated with a vessel then at lower pressure, primary gas product from manifold Z will be caused to flow into the vessel associated with the thus opened valve.

As hereinafter more fully explained, the timed sequence of valve openings and closings is so arranged that during an initial period that the feed gas mixture to be separated is being introduced into column 1A through open valve 11, valves 91, 101 and 601 are also open, so that the portion of the gas that is not adsorbed by the bed in Column 1A passes in series through Column 1B and the effluent gas from Column 1B discharges through open valves 601 into primary product discharge manifold Z. Thus, vessels 1A and 1B constitute companion columns operating in series during this part of the cycle and provide a train effective in selective adsorption of components of the initial gas mixture charged. In the same way columns 2A and 2B connected in series and 3A and 3B in series respectively constitute similarly operating trains when these are on the adsorption stage of their operating cycle.

The operating sequence is so arranged that each of the vessels 1B, 2B, 3B does double duty with respect to the A group of vessels. During the time that vessel 4A is placed on adsorption by opening valve 14, it is coupled in series with Column 1B through opened valves 94, 101, and 601. Thus vessels 4A and 1B coupled in series, constitute an adsorption train. In like manner vessels 5A and 2B, 6A and 3B respectively, operate as adsorption trains.

1. ADSORPTION—The feed mixture from line 248 (FIG. 1) is passed in series through a pair of sorption vessels (say 1A and 1B of FIG. 3), with communicating valves 91 and 101 between them being open. Each of these vessels was previously brought to designed super atmospheric adsorption pressure level. The adsorption step is continued for a predetermined time until $CO_2$ breaks through the exit end of vesel 1A or somewhat short of it. The thus purified primary products, comprised of the unsorbed components of the feed are discharged from vessel 1B at approximately the feed gas pressure (minus pressure lost in the vessel and connecting lines).

2. HIGH PRESSURE RINSE—Part of the pure $CO_2$ recovered during desorption of a companion A vessel is employed to rinse the 1A vessel at the conclusion of step 1, the communicating valve between vessels 1A and 1B first having been closed. The rinsing step is continued until all of the void gas is purged out of vessel 1A. The purged products evolved are recycled to another A vessel undergoing step 1.

During step 2 while vessel 1A is being rinsed, vessel 1B undergoes steps 2a, 2b and 2c.

2a. PRESSURE EQUALIZATION I—Vessel 1B is connected in flow communication with another A vessel which has previously been evacuated to the lowest pressure level in the designed cycle, thereby equalizing the pressure between the connected vessels. Gas flows from the 1B vessel in a direction counter-current to step 1, and into the A vessel optionally at either end of that vessel.

2. PRESSURE EQUALIZATION II—At the end of step 2a vessel 1B is connected with another B vessel which has previously been rinsed with the primary low pressure effluent (step 3a) thereby discharging more gas from vessel 1B into a connected B vessel. During this step gas flow out of 1B is in the same direction as in step 2a and flows into the other connected B vessel in initial feed gas flow direction (step 1).

2c. DESORPTION—Countercurrent gas withdrawal from 1B is continued until near ambient level. The effluent consists of dilute impurities of the feed gas mixture together with some $H_2$ and $N_2$.

3. DESORPTION—Step 2 having been completed $CO_2$ is withdrawn from vessel 1A countercurrent to feed direction to a designed intermediate pressure level. The withdrawn gas is recompressed to feed pressure level and recirculated into an A vessel then undergoing step 2

While vessel 1A is undergoing step 3, vessel 1B is subjected to steps 3a and 3b.

3a. LOW PRESSURE RINSE—Column 1b following step 2c, is rinsed countercurrent to feed direction, at the previously attained near ambient pressure level, using a part of the desorbed high purity product gas obtained as primary effluent during step 1—(hydrogen). The rinse effluent from 1B may be mixed with the effluent from step 2c and the mixture employed as fuel in the gas heater 210 (as indicated by line 254 of FIG. 1).

3b. PRESSURIZATION—Vessel 1B is brought back to designed intermediate superatmospheric pressure level by introduction of primary product gas (hydrogen/nitrogen) in a direction countercurrent to feed (the intermediate level being that obtained after step 2a). At this point vessel 1B is connected in flow communication with one of the A vessels which has undergone step 6 below, and the two vessels are further pressurized to designed feed pressure level. The pressurizing gas flows from the B vessel into the A vessel in a direction countercurrent to feed direction.

4. DESORPTION II—After step 3, depressurization of vessel 1A is continued (countercurrent to feed direction) to bring the vessel to about ambient pressure level. The desorbed gas comprised of substantially pure $CO_2$, is discharged from the system (line 260, FIG. 1) and may be recovered for any desired use.

5. EVACUATION—Vessel 1A is next evacuated to the lowest designed subatmospheric pressure level by withdrawal of gas therefrom in a direction countercurrent to feed direction. The withdrawn gas ($CO_2$) may be added to the product in line 260, FIG. 1).

6. PRESSURE EQUALIZATION—Vessel 1A is next connected with a B vessel then undergoing step 2a thus bringing both vessels to an intermediate pressure level.

7. PRESSURIZATION—Vessel 1A is next brought to designed super-atmospheric pressure level by introduction of primary product gas flowing from the B vessel then undergoing the latter part of step 3b.

Vessel 1A is now ready for repetition of a new cycle starting with step 1 and is in flow communication with one of the B vessels which has completed step 3b.

Table 1 below sets out the temperatures and pressures of the key streams shown in FIG. 1 and the flow rates of the stream components in pound moles/hr.

TABLE 1

| | T, P, and Flowrates of Key Streams in FIG. 1 | | | | | | | | | | |
|---|---|---|---|---|---|---|---|---|---|---|---|
| | 204 | 222 | 215 | 227 | 218 | 224 | 232 | 240 | 248 | 251 | 255 |
| P (PSIA) | 405 | 375 | 380 | 380 | 370 | 340 | 340 | 310 | 300 | 20 | 290 |
| T (°F.) | 100 | 340 | 410 | 439 | 1000 | 1732 | 1642 | 427 | 100 | 100 | 100 |
| Flowrates # moles/hr | | | | | | | | | | | |
| $CH_4$ | 2783.6 | | 1835.5 | 948.1 | 1835.5 | 14.1 | 118.1 | 118.1 | 118.1 | 118.1 | 0.0 |
| $H_2$ | | | | | | 3852.7 | 6879.4 | 8229.6 | 8229.6 | 822.9 | 7406.1 |
| CO | | | | | | 1033.2 | 1382.5 | 32.3 | 32.3 | 32.3 | 0.0 |
| $CO_2$ | | | | | | 788.2 | 1382.9 | 2633.2 | 2621.0 | 0.0 | 0.0 |
| $O_2$ | | 1200.0 | | | | 0.0 | 0.0 | 0.0 | 0.0 | 0.0 | 0.0 |
| $N_2$ | | 3738.7 | | | | 3738.8 | 3738.8 | 3738.8 | 3738.4 | 747.7 | 2990.7 |
| $H_2O$ | | 39.2 | 4588.8 | 5705.7 | 4588.8 | 4418.3 | 8785.4 | 7435.1 | 50.2 | 0.0 | 0.0 |
| Ar | | 47.9 | | | | 47.9 | 47.9 | 47.9 | 47.9 | 9.6 | 38.3 |

TABLE 1-continued

| | T, P, and Flowrates of Key Streams in FIG. 1 | | | | | | | | | |
|---|---|---|---|---|---|---|---|---|---|---|
| | 204 | 222 | 215 | 227 | 218 | 224 | 232 | 240 | 248 | 251 | 255 |
| Total | 2783.6 | 5025.9 | 6424.3 | 6653.8 | 6424.3 | 13893.2 | 22235.0 | 22235.0 | 14837.0 | 1730.6 | 10435.1 |

The operation of the described PSA system of FIG. 3 is summarized in Table 2.

The position of the various valves during a single cycle of the PSA embodiment of FIG. 3 is shown in Table 3. The designation 0 indicates that the valve is open, blanks indicated closed valves.

TABLE 2

PSA Cycle Chart

| Time Units/ Bed # | A Beds | | | | | | B Beds | | |
|---|---|---|---|---|---|---|---|---|---|
| | 1–3 | 4–6 | 7–9 | 10–12 | 13–15 | 16–18 | 1–3 | 4–6 | 7–9 |
| 1 | ADS | HP RINSE | DP | EVAC | PE:IDLE | IDLE:RP | ADS | PE:PE2:DP | P:PE2:RP |
| 2 | IDLE:RP | ADS | HP RINSE | DP | EVAC | PE:IDLE | P:PE2:RP | ADS | PE:PE2:DP |
| 3 | PE:IDLE | IDLE:RP | ADS | HP RINSE | DP | EVAC | PE:PE2:DP | P:PE2:RP | ADS |
| 4 | EVAC | PE:IDLE | IDLE:RP | ADS | HP RINSE | DP | | | |
| 5 | DP | EVAC | PE:IDLE | IDLE:RP | ADS | HP RINSE | | | |
| 6 | HP RINSE | DP | EVAC | PE:IDLE | IDLE:RP | ADS | | | |

TABLE 3

Valve Position for FIG. 3 of Open (Otherwise Closed)

| Time Unit | 11 | 21 | 31 | 41 | 51 | 61 | 71 | 91 | 12 | 22 | 32 | 42 | 52 | 62 | 72 | 92 | 13 | 23 | 33 | 43 | 53 |
|---|---|---|---|---|---|---|---|---|---|---|---|---|---|---|---|---|---|---|---|---|---|
| 1 | 0 | | | | | | | 0 | | | | | | | | | | | | | |
| 2 | 0 | | | | | | | 0 | | | | | | | | | | | | | |
| 3 | 0 | | | | | | | 0 | | | | | | 0 | 0 | | | | | | |
| 4 | | 0 | | | 0 | | | | 0 | | | | | | 0 | | | | | | |
| 5 | | 0 | | | 0 | | | | 0 | | | | | | 0 | | | | | | |
| 6 | | 0 | | | 0 | | | | 0 | | | | | | 0 | | | | | | |
| 7 | | | 0 | | | | | | | 0 | | | 0 | | | | 0 | | | | |
| 8 | | | 0 | | | | | | | 0 | | | 0 | | | | 0 | | | | |
| 9 | | | | 0 | | | | | | 0 | | | 0 | | | | 0 | | | | |
| 10 | | | | | 0 | | | | | | 0 | | | | | | | | 0 | | |
| 11 | | | | | 0 | | | | | | 0 | | | | | | | | 0 | | |
| 12 | | | | | 0 | | | | | | | 0 | | | | | | | 0 | | |
| 13 | | | | | | | 0 | | | | | | 0 | | | | | 0 | | | |
| 14 | | | | | | | | | | | | | 0 | | | | | 0 | | | |
| 15 | | | | | | | | | | | | | 0 | | | | | | | 0 | |
| 16 | | | | | | | | | | | | | | | 0 | | | | | | 0 |
| 17 | | | | | | | | | | | | | | | | | | | | | 0 |
| 18 | | | | | | | 0 | | | | | | | | | | | | | | 0 |

| Time Unit | 63 | 73 | 93 | 14 | 24 | 34 | 44 | 54 | 64 | 74 | 94 | 15 | 25 | 35 | 45 | 55 | 65 | 75 | 95 | 16 | 26 |
|---|---|---|---|---|---|---|---|---|---|---|---|---|---|---|---|---|---|---|---|---|---|
| 1 | 0 | | | | | | | 0 | | | | | 0 | | | | | | | | |
| 2 | | | | | | | | 0 | | | | | 0 | | 0 | | | | | | |
| 3 | | | | | | | | 0 | | | | | | | | 0 | | | | | |
| 4 | | | | | | | | | 0 | | | | | | | 0 | | | | | 0 |
| 5 | 0 | | | | | | | | | | | | | | | 0 | | | | | 0 |
| 6 | | 0 | | | | | | | | | | | | | | | | | | | |
| 7 | | 0 | | | | | | | | | | | | | | | 0 | | | | |
| 8 | | 0 | | | | | | | | | | | | | | | 0 | | | | |
| 9 | | | 0 | | | | | 0 | | 0 | | | | | | | | | | | |
| 10 | 0 | | | 0 | | | | | | | | 0 | | | | | | | | | |
| 11 | 0 | | | 0 | | | | | | | | 0 | | | | | | | | | |
| 12 | 0 | | | 0 | | | | | | | | 0 | | | | | | 0 | | | |
| 13 | | | | | 0 | | | | 0 | | | 0 | | | | | | | 0 | | |
| 14 | | | | | 0 | | | | 0 | | | 0 | | | | | | | 0 | | |
| 15 | | | | | 0 | | | | 0 | | | 0 | | | | | | | 0 | | |
| 16 | | | | 0 | | | | | | | | | | | 0 | | 0 | | | 0 | |
| 17 | | | | 0 | | | | | | | | | | | 0 | | 0 | | | 0 | |
| 18 | | | | | | | 0 | | | | | | | | 0 | | 0 | | | 0 | |

| Time Unit | 36 | 46 | 56 | 66 | 76 | 96 | 101 | 301 | 401 | 501 | 601 | 102 | 302 | 402 | 502 | 602 | 103 | 303 | 403 | 503 | 603 |
|---|---|---|---|---|---|---|---|---|---|---|---|---|---|---|---|---|---|---|---|---|---|
| 1 | 0 | | | 0 | | | 0 | | | | | 0 | | 0 | | 0 | | | 0 | | |
| 2 | 0 | | | 0 | | | 0 | | | | | 0 | | | 0 | | | | | 0 | |
| 3 | 0 | | | 0 | | | 0 | | | | | 0 | | 0 | 0 | | | 0 | | | |
| 4 | | | | | | | | | 0 | | | 0 | | | | 0 | | 0 | | 0 | |
| 5 | | | | | | | | | 0 | | 0 | | | | | 0 | | | | 0 | |
| 6 | | 0 | | | | | | 0 | | | 0 | | | | | 0 | | | 0 | 0 | |
| 7 | | | 0 | | | | | 0 | | 0 | | | 0 | 0 | | 0 | | | | | 0 |
| 8 | | | 0 | | | | | | 0 | | | | | | | | 0 | | | | 0 |

TABLE 3-continued

| | Valve Position for FIG. 3 of Open (Otherwise Closed) | | | | | | | | | | | | |
|---|---|---|---|---|---|---|---|---|---|---|---|---|---|
| 9  | 0 |   |   | 0 | 0 |   | 0 |   |   | 0 |   |   | 0 | 0 |
| 10 |   | 0 | 0 |   |   | 0 | 0 |   | 0 |   |   | 0 |   |
| 11 |   |   | 0 |   |   | 0 |   |   | 0 |   |   |   |   |
| 12 |   |   | 0 |   |   | 0 |   | 0 | 0 |   |   | 0 |   |
| 13 |   |   |   | 0 |   |   | 0 |   |   | 0 |   | 0 |   | 0 |
| 14 |   | 0 |   |   | 0 |   | 0 |   |   | 0 |   |   |   | 0 |
| 15 |   | 0 |   | 0 |   |   | 0 |   |   | 0 |   |   | 0 | 0 |
| 16 |   |   | 0 | 0 |   | 0 |   |   | 0 |   | 0 |   |   | 0 |
| 17 |   |   | 0 |   |   | 0 |   |   | 0 | 0 |   | 0 |   | 0 |
| 18 |   |   | 0 |   | 0 | 0 |   |   | 0 |   |   | 0 |   | 0 |

As adsorbent for the A columns of the PSA system 13X or 5A may be employed, preferably 13X. For the B columns one may use 5A.

EXAMPLE

Following is an example of a complete operation for production of $NH_3$ synthesis gas in a plant to produce 1200 T/D of $NH_3$. FIG. 1 and Table 1 are referred to in this description. The feed gas (stream 204) typically natural gas or a gas rich in methane is passed through the flue gas stack of a small fuel-fired heater 210 wherein it is preheated to 750° F. and then desulfurized in zinc oxide bed 211. The desulfurized product is saturated with water in 212, bringing the steam to carbon ratio to 1.72. The gas exits the saturator at 394° F. and is mixed with 420 psia and 480° F. steam in stream 213 to bring the steam to carbon ratio to 2.5.

The stream is now split into streams 216 and 215. Stream 215, containing 66% of the total stream, is used as feed to the autothermal reformer 220. Stream 216, containing 34% of the total stream is used as a portion of feed to EHTR 230.

Line 215 is heated to 1000° F. in the radiant section of heater 210 and is introduced by by line 218 into the inlet of autothermal reformer 220. Oxygen enriched air (23.9% $O_2$) is compressed and passed by line 222 at 375 psia through the flue stack of heater 210 where it is heated to 900° F. and introduced into the autothermal reformer 220. A portion of the hydrocarbons are combusted by reaction with oxygen at the inlet end of reformer 220. The remaining hydrocarbons are passed over a catalyst bed where they are reformed with steam to produce CO, $H_2$ and $CO_2$. The products formed are discharged via line 224 at a temperature of 1732° F. The waste heat available in the effluent form reformer 220 is used to reform the minor portion of the hydrocarbons in line 216, as hereinafter disclosed.

As indicated in FIG. 1, steam at 225 is added to line 216 to bring the steam to carbon ratio to 6.02. This mixture is heated by indirect heat exchange in exchanger 226 to 700° F. and introduced into EHTR 230 via line 227. The feed is reformed over the catalyst packed tubes at a temperature of 1500° F. Heat is provided from the hot reformate discharged at the exit end of the packed catalyst tube as well as hot reformed product from line 224.

The combined reformates exit the EHTR as stream 232 at 1642° F. The stream now contains 51% $H_2$ and 28% $N_2$ on a dry basis, with the balance CO, $CO_2$, $CH_4$ and AR. The gas is then cooled in waste heat boiler 234 to 955° F. and further cooled in exchanger 226 to 700° F. prior to entering high temperature shift reactor 233 as stream 232. Gas exiting the high temperature shift reactor at 793° F. is cooled in exchanger 235 to 650° F. and in exchanger 236 to 400° F. prior to entering low temperature shift reaction 138 as stream 239. Gas exiting the low temperature shift reactor at 427° F. as stream 240 is cooled in exchanger 241 to 320° F. and in exchanger 242 to 100° F. Condensate is separated out in 245. The gas stream enters the A beds of PSA system 250 as stream 248.

In the A beds the $CO_2$ is removed from gas stream 248 and in the B beds contained methane and carbon monoxide are removed as stream 251. Product gas exits the PSA system as stream 255.

The present invention has been described with reference to one or more embodiments but the full scope of the invention should be ascertained by the claims which follow.

What is claimed:

1. In the production of ammonia synthesis gas, the method which comprises:

(a) introducing a first portion of a preheated hydrocarbon vapor charge rich in methane into an autothermal reactor together with steam and oxygen-enriched air, thereby inducing combustion of part of the introduced hydrocarbon charge and elevating the temperature to effect oxidation of said first hydrocarbon charge with resulting formation of hydrogen and oxides of carbon;

(b) introducing a second portion of the preheated hydrocarbon vapor charge together with added steam into one end of a heat exchange reactor;

(c) discharging the reaction product from said autothermal reactor directly into the other end of said heat exchange reactor, to flow therethrough countercurrently to said second portion of hydrocarbon vapor charge and in indirect heat exchange therewith, whereby said second portion of the hydrocarbon charge is brought to an elevated temperature effective for reaction of said second hydrocarbon portion with steam;

(d) mixing the product of the steam-reacted second portion of hydrocarbon charge with the reaction product from said autothermal reactor within said heat exchange reactor to effect direct heat exchange therebetween and discharging the obtained reformate mixture from said heat exchange reactor;

(e) cooling the discharged mixture and subjecting the same to shift reaction in the presence of steam to effect conversion of contained carbon monoxide to carbon dioxide with accompanying release of additional hydrogen; and (f) cooling the shift reaction product to a temperature level effective for condensation of contained water and separating the resulting condensed water from said shift reaction product to yield a cooled gas stream comprising hydrogen, nitrogen, and carbon dioxide.

2. The method as defined in claim 1 wherein the charge is introduced into said autothermal reactor at a temperature in the range of 900° to 1000° F. and the reaction product is discharged therefrom at a temperature in the range of 1500° to 1750° F.

3. The method as defined in claim 1 wherein the fresh vapor hydrocarbon charge is introduced into said heat exchange reactor at a temperature in the range of 650° to 750° F. and the reactor product from said autothermal reactor is introduced into said heat exchange reactor at a temperature in the range of 1500° to 1750° F.

4. The method as defined in claim 1 wherein the vapor hydrocarbon charge introduced into said autothermal reactor and the fresh hydrocarbon vapor charge to said heat exchange reactor both are comprised of natural gas.

5. The method as defined in claim 4 wherein the charge is introduced into said autothermal reactor at a temperature of about 960° F. and the reaction product therein produced is discharged therefrom at a temperature of about 1730° F.

6. The method as defined in claim 4 wherein said second fresh vapor hydrocarbon charge is introduced into said heat exchange reactor at a temperature of about 700° F. and the reaction product from said autothermal reactor is introduced into said heat exchange reactor at about 1730° F.

7. The method as defined in claim 4 wherein the obtained reformates mixture discharged from said heat exchange reactor has a hydrogen to nitrogen molar ratio in excess of 1.8.

8. The method as defined in claim 4 wherein said oxygen-enriched air admitted to said autothermal reactor has an oxygen content of 22 to 30 mol percent.

9. The method as defined in claim 4 wherein said oxygen-enriched air admitted to said autothermal reactor has an oxygen content of about 24 mol %.

10. The method as defined in claim 1 wherein the charge to said autothermal reactor is (1) a hydrocarbon stream comprised chiefly of natural gas and steam in a steam to carbon mole ratio of about 2.5 and (2) an oxygen-enriched air stream containing about 23 to 24 mol percent oxygen.

11. The method as defined in claim 1 wherein the reaction product discharged from said autothermal reactor contains on a water-free mol basis, about: 18-20% oxides of carbon, 39-41% hydrogen, 18-40% nitrogen, and the balance methane and argon.

12. The method as defined in claim 1 wherein the mixed reformates discharged from said heat exchange reactor comprise on a water-free mol basis, about: 20 mole percent oxides of carbon, 28 percent nitrogen and over 50 percent hydrogen.

13. The method as defined in claim 1 wherein the first portion of the feed as charged to said autothermal rector contains steam and hydrocarbons at a steam to carbon ratio of about 2.5, and the second portion charged directly to said heat exchange reactor has a steam to carbon ratio of about 6.0.

* * * * *